UNITED STATES PATENT OFFICE.

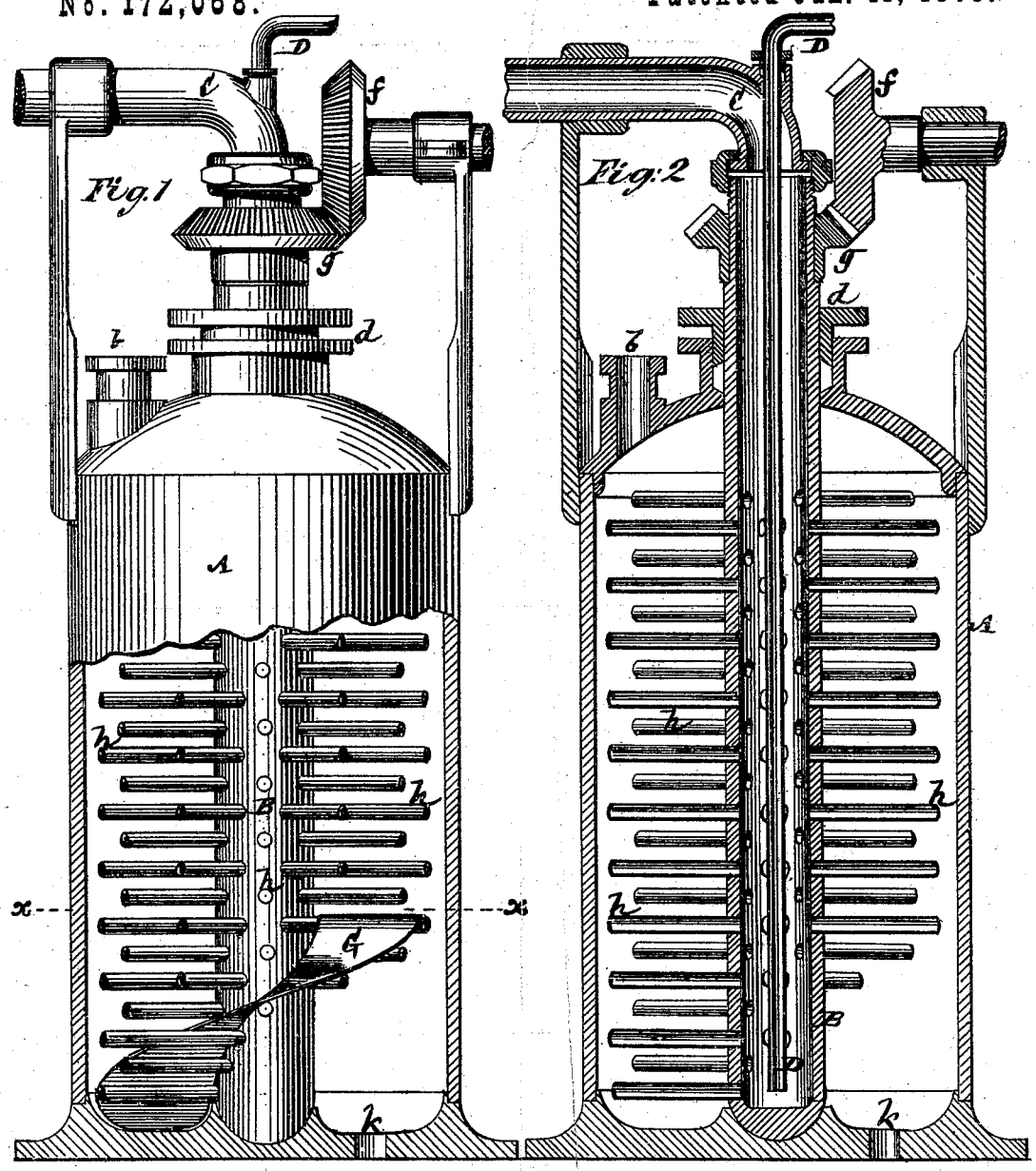

BENJAMIN T. BABBITT, OF NEW YORK, N. Y.

IMPROVEMENT IN APPARATUS FOR THE MANUFACTURE OF SOAP.

Specification forming part of Letters Patent No. 172,068, dated January 11, 1876; application filed July 1, 1875.

*To all whom it may concern:*

Be it known that I, BENJAMIN T. BABBITT, of the city, county, and State of New York, have invented certain new and useful Improvements in Apparatus for the Manufacture of Soap; and I do hereby declare that the following is a full, clear, and exact description of the same, reference being had to the accompanying drawing, which forms part of this specification.

This invention relates to the manufacture of soap, either under heat or under heat and pressure combined, in which the vessel containing the oil or fatty matters and lye to produce saponification is fitted or provided with a revolving mechanical agitator, for the purpose of producing a thorough mixing of the contents the vessel.

The invention consists in a combination with the saponifying-vessel, of an interior hollow revolving mechanical agitator, to which steam is admitted through a stuffing-box, or otherwise from above, and which is provided with hollow radial arms or beaters in free communication at their inner ends with the hollow shaft, said beaters being arranged in a spiral manner around the said shaft, as will hereinafter appear.

The invention also consists in a combination with said agitator of a discharge-pipe for the water of condensation, the same being arranged to pass upward within the hollow shaft of the agitator from or near the bottom of the latter, and out through the top thereof, thus dispensing with any water-discharge opening in the bottom of the vessel.

In the accompanying drawing, Figure 1 represents a partly broken elevation of an apparatus constructed in accordance with my invention. Fig. 2 is a vertical section of the same, and Fig. 3 is a horizontal section on the line $x\ x$.

A is the vessel, in which the oil or fatty matters and lye to produce saponification are introduced through an opening, $b$, above. This vessel may be a close one, and is of an upright cylindrical construction. B is the upright revolving shaft of the agitator, which works within said vessel. This shaft is closed at its bottom, but, passing through a stuffing-box, $d$, above, is open at its top, and in free communication at such point with a steam-pipe, C, about which it revolves. Bevel-gears $f\ g$ may serve to give the necessary revolving motion to the agitator.

Arranged in a zigzag or spiral manner around this shaft B are hollow radial arms or beaters $h\ h$, which are closed at their outer ends, but are in free communication at their inner ends with the interior of the shaft, so that steam entering the shaft circulates also within the beaters, thereby imparting a large amount of heat to the contents of the vessel A, as well as thoroughly agitating the same, and whereby an outside heating case or jacket to the cylinder may be dispensed with, also the latter be relieved of all excessive pressure; likewise, a vessel or cylinder of reduced diameter may be used, and a high degree of heat be attained for the mass under treatment.

The water of condensation forming or collecting in the bottom of the shaft B is forcibly expelled by the pressure of the steam in said shaft up through a discharge-pipe, D, arranged to project down within said shaft in proximity to its bottom, and passing out through its top or through the steam-pipe entering said top. The water thus discharged may be returned by a pump back to the boiler which supplies the apparatus with steam. This mode of freeing the agitator of water dispenses with any opening in the bottom of the vessel for such purpose, with its attendant annoyance of leakage, and a perfect clearance, without waste of steam, is effected. The saponified matter in the vessel is or may be drawn off through an opening, $k$.

To effect still more thorough agitation of the mass in the vessel A, and to prevent the lye from settling below, the shaft B is provided at its lower part with an exterior screw blade or lifter, G, arranged to extend more or less around the shaft, and to sweep the lower portion of the saponifying-vessel.

I claim—

1. The combination of the closed vessel A, the revolving hollow upright shaft B, and the series of spirally-arranged horizontal hollow arms $h$, each having its inner end attached to and in free communication with the interior of the upright shaft, substantially as and for the object specified.

2. The combination, with the hollow agitator-shaft B, constructed to receive steam from above, of the upwardly-discharging pipe D for the water of condensation collecting in said shaft, essentially as described.

B. T. BABBITT.

Witnesses:
EDWARD R. BARTON,
E. F. GIBBONS.